United States Patent [19]
Gevas

[11] 3,963,901
[45] June 15, 1976

[54] DATA PROCESSING SYSTEM

[75] Inventor: James Constantine Gevas, Roseland, N.J.

[73] Assignee: Intelcom Industries Incorporated, San Diego, Calif.

[22] Filed: Aug. 26, 1974

[21] Appl. No.: 500,512

[52] U.S. Cl. ................. 235/61.11 D; 235/61.12 M; 235/61.12 R
[51] Int. Cl.$^2$ .................... G06K 7/08; G06K 19/06
[58] Field of Search ............ 235/61.12 M, 61.12 N, 235/61.11 E, 61.11 D; 340/146.32

[56] References Cited
UNITED STATES PATENTS

| | | | |
|---|---|---|---|
| 2,547,838 | 4/1951 | Russell | 235/61.12 M |
| 3,685,723 | 8/1972 | Berler | 235/61.11 E |
| 3,777,165 | 12/1973 | Bryant et al. | 235/61.11 E |

*Primary Examiner*—Daryl W. Cook
*Attorney, Agent, or Firm*—Watson Leavenworth Kelton & Taggart

[57] ABSTRACT

Data characters having a given number of bits are encoded in individual linear arrays transverse to a scanning path and spaced apart along said path for successive readout by a reading head scanning said path. Index bits, all having logical 1, i.e., mark, significance, are disposed in separate linear arrays parallel to and adjacent each character. The scanning head has at least 2x pairs of sensors consisting each of an index and a data sensor where x equals the number of bits in a character. The geometry in one embodiment is such that at least two adjacent sensor pairs scan each data bit and at least one unused sensor pair is between sensor pairs responding to adjacent bits in a character. Electronic logic sorts the signals obtained from the sensors, in spite of varying registration and skew, during a scan of said path to enter the bits of alternate characters in respective alternate memory banks.

15 Claims, 8 Drawing Figures

TIMING CHART

Fig. 8.

DATA PROCESSING SYSTEM

The present invention relates to a data processing system and, in particular, to a system enabling encoded data to be read by a hand held scanning device in spite of significant changing registration and/or skew.

In a typical code mark field, the bits of digital characters may be encoded in vertical columns with the characters in side-by-side relationship. Each horizontal row may then represent a different value significance for the particular character bit. Imagine a field in which a single mark in a predetermined location represent a logical 1 while an absence of a mark at such location represents a logical 0. Assume the provision of a mark sense reader having a linear array of sensor elements. Typically, such array would be comprised of individual cells vertically sequenced where the cells have substantially the same approximate geometry and separation as the mark locations of a character column in the code field. If such reader scans the code field by moving along a line parallel to the horizontal rows while oriented parallel to the vertical columns, the reader will scan each character column sequentially with all of the bits of any one character being scanned simultaneously. If vertical registration of the reader is not readily maintainable, the reader can readily be constructed of greater length than the character column such that the reader array will always cover the vertical height of the code mark field. However, if angular registration is deficient, a more complex problem exists. Under such condition, that is, a skew condition, the reader can simultaneously sense two or more adjacent character columns depending upon the relative geometry. Of course, this latter problem can be avoided by providing sufficient space between adjacent character columns. However, this approach increases the spatial area consumed by the code mark field and is undersirable.

Alternatively, the reader can be provided with parallel arrays of sensors such that the rectangular space covered by the sensor array field will cover at least one complete coded character column regardless of skew. This approach, unfortunately, requires a significant increase in reader costs.

An object of the present invention is to provide a system of encoding, and apparatus for the reading thereof, which is significantly free from the restraints of spatial registration enabling a recorded medium to be scanned by a hand held probe with less than perfect spatial restraint.

It is a further object of the present invention to accomplish the foregoing results while restricting the encoded information to a minimum physical area with resultant economy.

While the invention is best applicable to a system employing a hand held reader, and the preferred embodiment to be described hereinafter incorporates such a reader, it should be understood that the invention has utility and can be applied to other reading heads or reading devices.

In accordance with one aspect of the subject invention, there is provided a data processing system for recording data in multiple channels in machine readable form in a recording medium and reading said data from said medium with a scanning sensor, said sensor system being characterized by a sensor for scanning said recording medium with less than perfect spatial restraint, and means coupled to said sensor responsive to signals detected thereby for identifying said data and determining the respective channels thereof in spite of any shifting relative registration and skew.

In accordance with another aspect of the subject invention, there is provided a method of recording data in a recording medium along a path scannable by a reading head which comprises recording a linearly disposed array of index bits transverse to said path at spaced intervals along said path, said index bits in an array being substantially equally spaced from each other and aligned with the bits in adjacent arrays to define along said path a plurality of substantially parallel channels, the number of said bits in each of said arrays being equal to the number of bits in a data character, and recording said data in data characters with each character adjacent and substantially parallel to a different one of said arrays of index bits, said character being composed of data bits each substantially coinciding with a different one of said channels.

The invention will be better understood after reading the following detailed description of a presently preferred embodiment thereof with reference to the appended drawings in which.

Throughout the drawings the same reference numerals are used to designate the same or similar parts.

Figure 1:
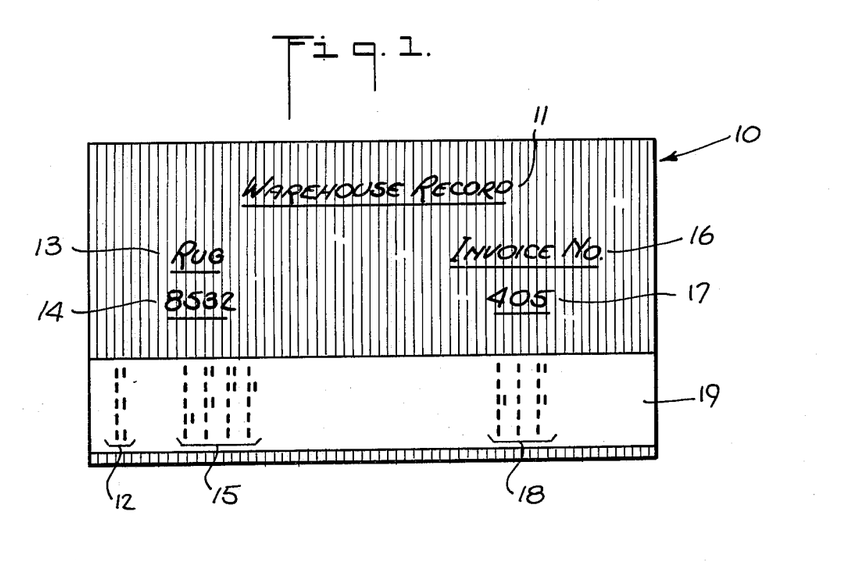
FIG. 1 is a plan view of a typical encoded document containing recorded information in both clear text and machine readable form in accordance with the invention.

Referring now to FIG. 1, there is designated generally by the reference numeral 10 a typical document illustrating a use for the subject invention. Solely for purpose of such illustration, the document 10 is shown as a warehouse record slip or tag which can be affixed to an article of merchandise in a warehouse for the purpose of inventory control and other merchandise record keeping. In the particular example illustrated, the legend "Warehouse Record" is pre-printed by the printer at 11. Utilizing the encoding method to be described hereinafter, the coded representation of Warehouse Record is entered in the document in the region 12. This entry might be made at a data processing center for the warehouse.

Identification of the merchandise is shown in clear text at 13 as a "rug". This might be printed on the document 10 in the warehouse at a receiving station. At the samee time, an article identification number might be entered in clear text at 14 to identify the particular rug in question. Here the number is shown as "8532". Simultaneously, with the printing of the identification number in clear text at 14, it would be encoded in accordance with the present invention in the area 15, for example.

At 16 there is shown a clear text legend identifying the type of document; in this case an "invoice" with a reference to an identification number which is shown at 17 as the number "405". The invoice number would be printed on the document at the warehouse in accordance with the particular inventory system being employed. Corresponding to the clear text entry at 17 would be an encoded entry at 18 which would be effected at substantially the same time.

In accordance with the subject invention, encoding of the required data at 12, 15 and 18 is effected by punching holes through the document in a region containing a stripe 19 of magnetic ink or similar material. This is best seen by referring to FIG. 3 where the encoded entry 18 is shown on an enlarged scale. As shown, the punched holes are in the form of rectangular slots although said configuration is merely exemplary and may be varied as will be apparent from the ensuing discussion.

Figure 2:
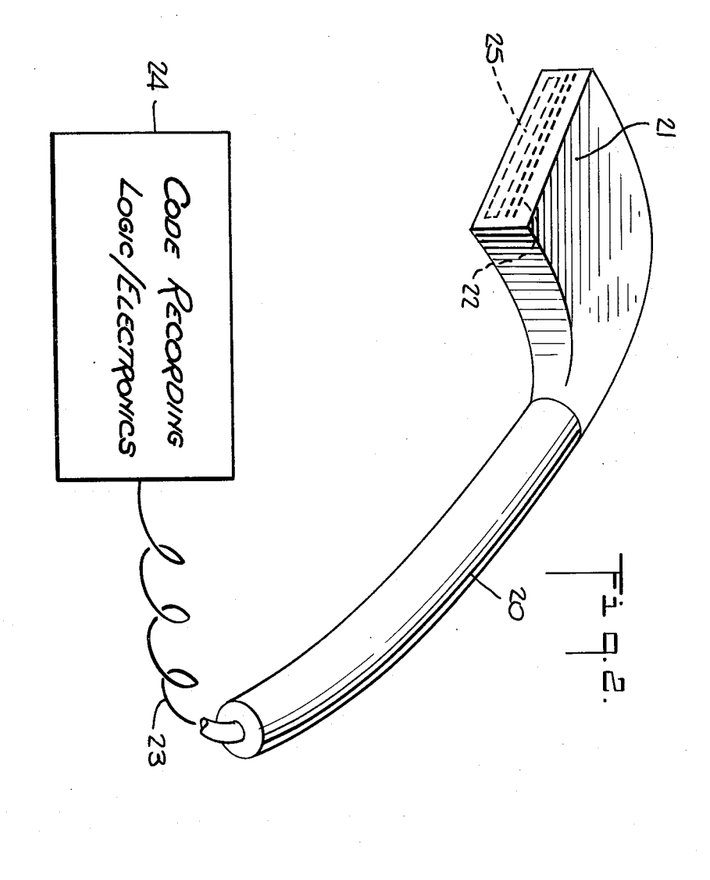
FIG. 2 is a diagrammatic view of a hand holdable reading head or sensor coupled to a code recording logic/electronics system for reading the encoded information from the document of FIG. 1.

Referring now to FIG. 2, there is shown a hand held probe 20 having a reading head at 21 which contains an array of sensor elements 22 adjacent a flat face thereof. The probe 20 is connected by a suitable cable 23 to the recording logic/electronics system 24. When it is desired to enter the information encoded in the document 10 into the data processing system, the hand held probe 20 with its reading head 21 is swept across the magnetic stripe 19 on the document 10 from left to right as seen in FIG. 1. Of course, the direction could be reversed if so desired by suitably transposing the order in which the coding is accomplished. The encoded data at 12, 15 and 18 is sensed and transmitted through the cable 23 to the system 24 for processing.

As contemplated herein, the sensor array 22 includes a plurality of magnetic sensing coils. Adjacent the sensing coil array in the face of the probe is mounted a magnet 25 for preceding the sensing coils during a scanning operation in order to uniformly magnetize the magnetic coating or stripe 19 prior to passage of the sensing coils 22 over the code punchings through the document. The sensing coils in the array 22 will be affected by a magnetic discontinuity when they pass over an aperture through the magnetic material. Such discontinuity produces an electric signal which can be operated upon to provide the requisite reading function. In the present example, a punched hole represents a logical 1 while the absence of a hole in a bit location will be interpreted as a logical 0.

Figures 3, 4, 5, 7:
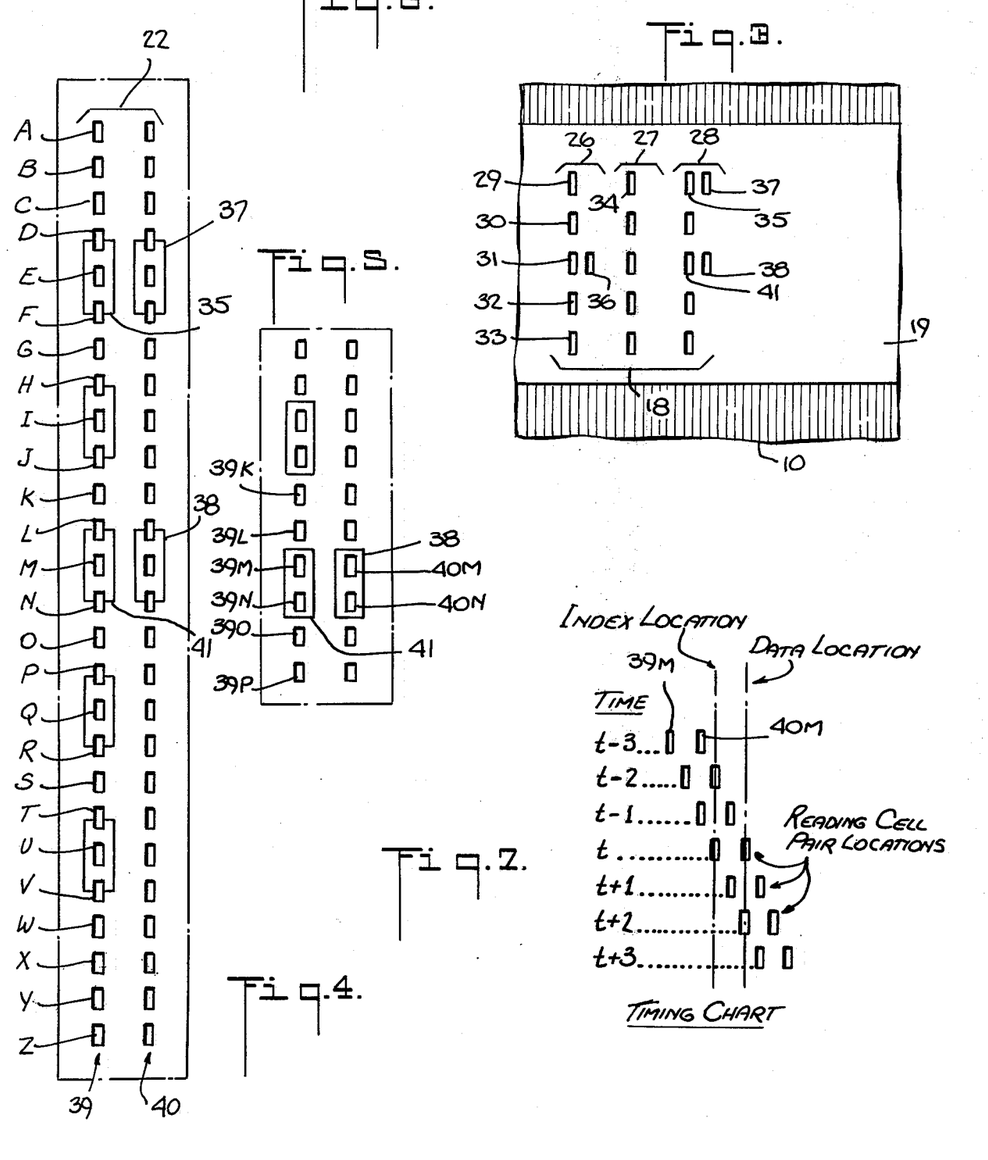
FIG. 3 is an enlarged view of a portion of the document of FIG. 1 showing in greater detail the encoding method employed therein.
FIG. 4 is an enlarged diagrammatic view illustrating one possible instantaneous relationship between the reading hand and a section of the encoded field.
FIG. 5 is a fragmentary view similar to FIG. 4 showing a change in registration of the reading head relative to the field.
FIG. 7 is a timing chart useful in explaining the operation of the subject system.

Reference should now be had to FIG. 3. The details are shown therein concerning the encoding of the number 405. It will be observed that the entry 18 consists of three groups of apertures assembled in an array transverse to the longitudinal axis of the stripe or path 19. The groups are shown at 26, 27 and 28 and correspond, respectively, to the individual digits "4", "0" and "5" of the number 405. Considering the group 26, for example, it consists of a straight line array of five apertures 29, 30, 31, 32 and 33. Each of said apertures may be considered as a bit lying in a corresponding value significant channel extending parallel to the longitudinal axis of the path 19. The value significance may be such that the bit 29 is in the channel representing the least significant digit in the binary system of notation, while the bit 33 lies in the channel representing the most significant digit. Thus the weight significance of each of the bits 29 to 33, inclusive, is equal, respectively, to 1, 2, 4, 8 and 16. The array of bits 29 through 33, inclusive, represent the index mentioned aforesaid for defining the said channels. It will be observed that the groups 27 and 28 have similar arrays of index bits with the first channel containing the index bits 34 and 35, respectively.

Each character, in the instant case the binary number corresponding in value significance to a decimal integer, plus an extra bit for auxiliary use, is encoded with the bits of each character located in a straight line array normal to the longitudinal axis of the path 19 with each bit lying in its corresponding value significant channel as defined by the index bits previously described. The character bits are located immediately adjacent and parallel to a corresponding array of index bits. Thus, the integer 4 is represented by the bit 36 shown in its appropriate weight significance adjacent index bit 31.

As already mentioned, the aperture or punched hole 36 represents a logical 1 while an absence of a punch mark adjacent an associated index bit represents a logical 0. It follows, therefore, that the integer 0 is represented by a complete absence of punch marks adjacent the index bits of group 27, while the integer 5 is represented by bits indicating logical 1's at 37 and 38.

Since the decimal integers 0 to 9 require only four binary places for encoding same, the fifth binary place represented by the channel including bit 33 is available for encoding letters or symbols or the like as required.

The hand holable probe 20 of FIG. 2 has two parallel linearly disposed arrays 39 and 40 of sensing cells with each of said last mentioned arrays including $(3x-1)$ cells where $x$ equals the number of bits in a single character, i.e., five. This is best seen in FIG. 4 which shows diagrammatically on an enlarged scale the relationship of the cells in the probe for a particular orientation relative to the magnetic stripe 19 in the process of reading the encoded group 28. It will be observed that each of the arrays 39 and 40 contains 26 sensing cells. The array 39 forms with the array 40 an array of pairs of sensors with the sensors of each pair being effectively spaced apart to form two spaced apart parallel arrays of sensors, namely, the arrays 39 and 40. Each pair of sensors is effectively spaced from the adjacent pair. To assist in identification, the pairs are referred to by the letters A through Z, inclusive, such that the sensor heading the array 39 is identified by the number 39A while the sensor heading the array 40 is identified by the number 40A. The spacing between and the size of the field covered by each sensor is related to the equidistantly spaced channels described in reference to FIG. 3, and to the recorded data therein such that upon causing the head 21 to traverse the path 19, at least two adjacent pairs of said sensors will respond to the recorded data in each of said channels and at least one pair of non-responsive sensors will be disposed between pairs of sensors responding to adjacent channels. This is best seen as shown in FIGS. 4 and 5. In this arrangement $(3x-1)$ sensor cells are employed. Thus with a particular vertical registration the sensors 39L, 39M and 39N respond to the index bit 41 in the orientation of FIG. 4, while only sensors 39M and 39N respond to the same bit in the slightly shifted orientation of FIG. 5. Adjacent sensors 39K and 39O are unaffected. Similarly, as seen in FIG. 4, sensors 40L, 40M and 40N sense the bit 38 therein, while in FIG. 5 sensors 40M and 40N sense bit 38.

Figure 6:
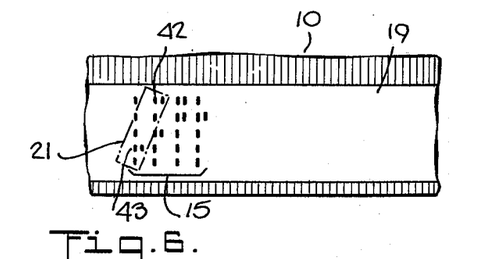
FIG. 6 is a fragmentary view of the document of FIG. 1 showing a skew relationship between the reading head and the encoded mark field being scanned.

The human hand is incapable of scanning the probe 20 over the encoded area of the document 10 with perfect spatial restraint. Consequently, it is assumed that the probe will waver somewhat both in the transverse direction and angularly as it is moved across the magnetic stripe 19. As best seen in FIG. 4, the probe has an excess number of sensor cells allowing for a substantial shift or movement of the probe transverse to the path 19 while permitting at least two adjacent cells to sense each of the encoded bits or punch marks. However, it must be understood that while, for example, sensors 39E and 40E may sense bits 35 and 37 in the group 28, the same sensors may not necessarily sense the bits in the same channel in an adjacent group. Thus, the electronic system for operating on the signals detected by the sensor cells must be arranged to deduce the proper channel and intepret the value significance of the detected bit. This is accomplished by the system to be described. Moreover, the system accommodates a further freedom from restraint as shown schematically in FIG. 6 wherein the reading head 21 is shown scanning the data entries 15 at a skew angle such that a portion of the sensor is reading the bits in group 42 while a different portion of the sensor is reading the bits in group 43.

Before considering the detailed circuit for accomplishing the desired results, it will be helpful to consider briefly the broad aspects of the method by which the readings detected by the probe are sorted and routed to allow for the various irregularities in registration and skew. The provision of the index bits corresponding to each of the value significant channels provides information to the probe and its associated electronics indicative of the completion of a scan over a complete character entry. Two registers or memory banks are provided in the electronic equipment to be filled alternately by information obtained from the probe. Whenever five complete entries are located in a given memory banks, it is assumed that entry of the character is complete and it may be read out with the memory bank thereafter being reset to receive a new character. Starting from initial reset of the system, the first encoded entry encountered by a sensing pair of the probe will be entered in the first memory bank and the pair will be switched in preparation for feeding the next encountered entry to the second memory bank. Following prescribed logic, adjacent sensors encountering entry bits if the first word will feed signals to the first memory bank. Once a sensing cell has fed a signal to one memory bank, it will on it next turn feed a signal to the second memory bank by virtue of the foregoing switching unless logic indicates that inbetween it has missed an index bit and requires supplementary corrective switching.

For purpose of explaining certain of the operating aspects of the circuitry reference will be had from time to time to the timing chart shown in FIG. 7. The chart shows for various arbitrary times designated as ($t-3$), ($t-2$), etc. the relative position of a pair of sensors such as 39M and 40M relative to the location of the index bits and the character or data bits constituting a single encoded group. The same sensor pair is shown in a different position at each time interval. Thus, at time ($t-3$) the sensor pair is in front of the index location prior to being affected by the bits therein. At time ($t-2$) the sensor 40M is over the index location while at time ($t-1$) the sensor pair is straddling the index location. Time ($t$) represents the instance when the sensor pair is in direct reading registry with both the index and data locations. The post reading positions are shown at times ($t+1$) where the pair straddles the data location, at time ($t+2$) where the sensor 39M overlies the data location and may be affected by a bit therein, and the time ($t+3$) when the sensor pair has completely traversed the location of the encoding group.

As best seen from the time chart of FIG. 7 and from FIG. 4, at time ($t$) the sensor cell 39M coincides with the index location simultaneously with the sensor cell 40M coinciding with the data location. This relationship may be considered as the valid reading condition. Furthermore, it may be considered that the sensor 39M constitutes an index reading sensor while the sensor 40M constitutes a data reading sensor. Hence, any sensor in array 39 of the reading head 21 will be construed as an index sensor while any sensor in array 40 will be construed as a data sensor. It should be understood that FIG. 4 represents a schematic view of the relationship as viewed from the orientation or position of the probe or head locking down upon the encoded path 19.

As mentioned above, each sensor in array 39 has an associated sensor in array 40 constituting a pair in a given channel. Each pair of sensors is connected through the cable 23, seen in FIG. 2, to a corresponding electronic channel shown in detail in FIG. 8. Except for a few components of FIG. 8 which are common to all channels and which will be identified in the following description, the major portion of the circuit of FIG. 8 will be duplicated for each sensor pair or channel. Strictly by way of example, the circuit of FIG. 8 is described as associated with the sensor pairs consisting of sensors 39M and 40M.

Figure 8:
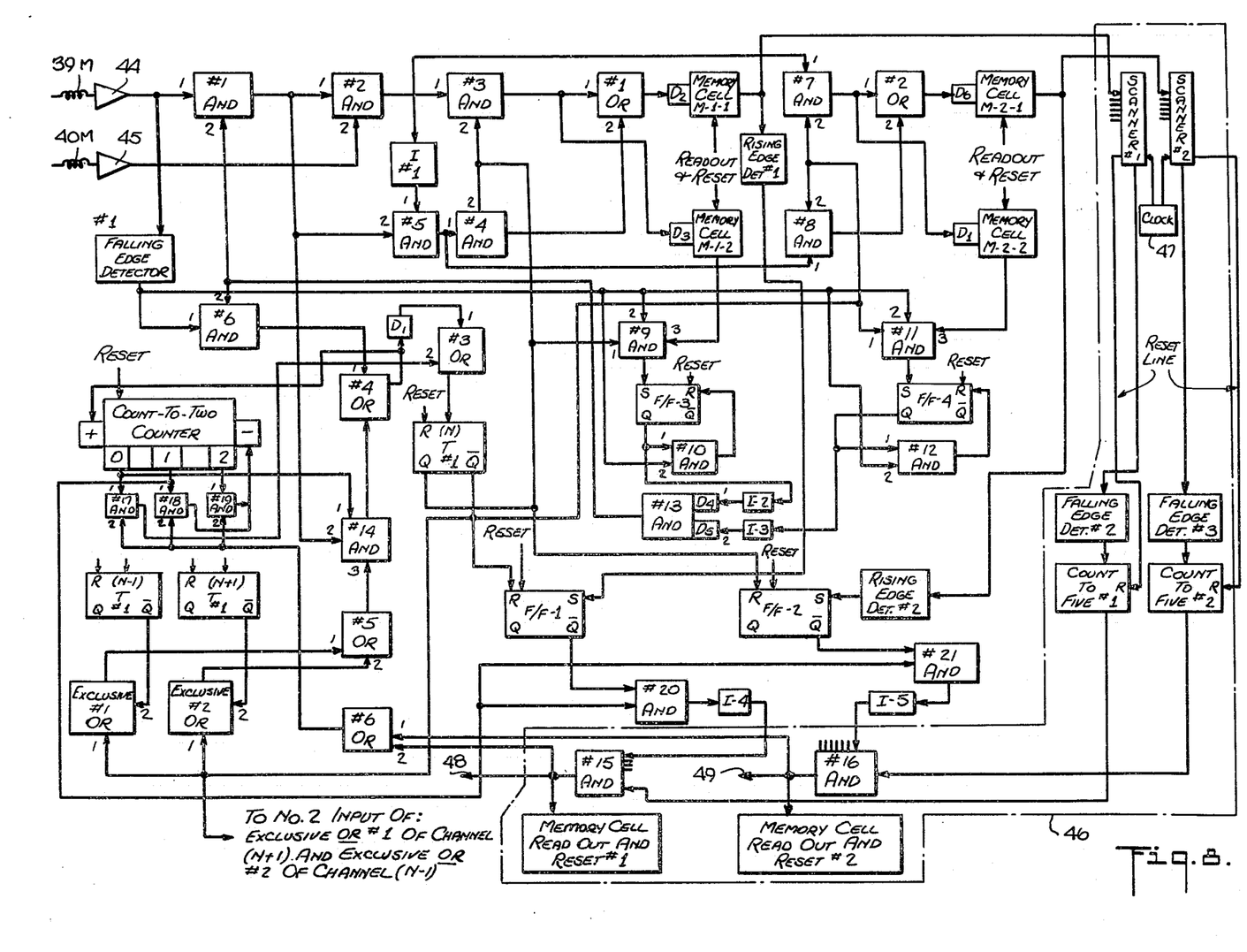
FIG. 8 is a schematic block diagram of a portion of the code recoding logic/electronics circuit of FIG. 2.

In order to simply the ensuing description, the following conventions will be followed, the symbol A— followed by a number identifies an AND gate bearing the particular number as it appears on the schematic diagram of FIG. 8. The symbol OR— followed by a number will, in similar fashion, designate an OR gate designated on said schematic. Set-reset flip-flop circuits are designated by the symbol F/F— followed by a number, while toggle type flip-flpps are designated by the symbol T— followed by a number. The abbreviation "FED" stands for "falling edge detector" while RED stands for "rising edge detector". Delay circuits are represented by D— followed by a number, while inverter circuits are identified by I— followed by a number.

Referring specifically to FIG. 8, sensor cell 39M is connected through an amplifier 44 to a first input of A-1 and to an input of FED-1. Sensor cell 40M is connected through a similar amplifier 45 to an input of A-2. The output from A-1 is fed to an input of A-2 as well as to an input of A-5 and an input of A-14. The output of A-2 is supplied to an input of I-1, an input of A-3 and an input A-7. The output of I-1 feeds an input of A-5. An output of A-5 feeds both an input of A-4 and of A-8. The output of A-3 feeds an input of OR-1 and an input of D-3. The second input of OR-1 is supplied from an output of A-4. The output from OR-1 is fed to an input of D-2. The output from D-2 is supplied directly to a memory cell M-1-1, while the output from D-3 is supplied directly to a memory cell M-1-2. Memory cells M-1-1 and M-1-2 constitute a pair in a first memory bank bridging all of the 26 sensor channels of the probe.

The output from A-7 is supplied to both an input of OR-2 and to an input of D-7. An output of A-8 is supplied to a second input of OR-2. The output from OR-2 is fed to an input of D-6 whose output feeds directly memory cell M-2-1. The output from D-7 feeds directly memory cell M-2-2. Memory cells M-2-1 and M-2-2 constitute a pair in the subject channel which is a part of a second memory bank bridging all of the remaining channels.

An output from memory cell M-1-1 is fed over one path to RED-1 whose output is connected to the Set input of F/F-1. A second connection from the last mentioned memory cell is effected to one input of a scanner or multiplex circuit No. 1 whose output is fed through FED-2 to a Count-to-Five circuit No. 1.

In similar manner, the output of memory cell M-2-1 is fed over one path to an input to a scanner circuit No. 2 whose output is fed through FED-3 to Count-to-Five circuit No. 2. A second connection from said last mentioned memory cell is effected through RED-2 to the Set input of F/F-2.

Memory cell M-1-2 has an output connected to one input of A-9. Similarly, memory cell M-2-2 has an output connected to an input of A-11. An output from FED-1 is connected over one path to an input of A-6 and over another path to one input each of A-9, A-10, A-11 and A-12. An output from A-9 is connected to the Set input of F/F-3 whose output Q is connected both to an input of A-10 and an input of I-2. An output of the latter is connected through D-4 to an input of A-13. Similarly, an output of A-11 is connected to the Set input of F/F-4 whose output Q is connected to an input of A-12 and an input of I-3. The output from the latter is connected through D-5 to an input of A-13. The output from A-13 is connected to an input of both A-1 and A-6. The output from A-6 is connected to an input of OR-4 whose output is connected through D-1 to an input of OR-3. A second connection is made from the output of OR-4 to the (+) input of a Count-to-Two counter. The latter has three output terminals corresponding to counts of zero, one and two. The zero output is connected to one input of A-17 whose output is connected to a second input of OR-3. The output from the latter is fed to the toggle input of T-1. To further identify this last mentioned toggle flip-flop circuit it is denoted on the drawing by a further symbol (N) signifying that it is the number one toggle for the subject channel. This distinction is necessary since connections are effected, as will be described hereinafter, to the corresponding toggle flip-flop in the next adjacent channels on either side. Such adjacent channels are identified, respectively, as channel (N−1) and (N+1). Whenever T-1 appears in the following description without a channel designation it should be understood as referring to the toggle flip-flop of the subject channel.

The Q output of T-1 is connected to an input of each of A-3, A-4 and A-9 as well as to the Reset input of F/F-2. The $\bar{Q}$ output from T-1 is connected to an input of each A-7, A-8 and A-11 as well as to the Reset input of F/F-1 and an input of the Exclusive OR circuit No. 1 and of Exclusive OR circuit No. 2. In addition, a connection is effected from the latter output of T-1 to an input of the Exclusive OR circuit No. 1 of channel (N+1) and to an input of the Exclusive OR circuit No. 2 of channel (N-1). The latter two Exclusive OR circuits are not shown in the subject drawing but should be understood to be identical to the corresponding circuits shown in FIG. 8 for the subject channel.

The output from Exclusive OR circuit No. 1 is connected to one input of OR-5 while the second input to the circuit OR-5 is obtained from the output of Exclusive OR circuit No. 2. The output from OR-5 is fed to an input of A-14. A third input to A-14 is obtained from the zero output of the Count-to-Two counter. The output from A-14 is fed to an input of OR-4.

The output from A-10 is fed to the Reset terminal of F/F-3 while the output from A-12 is fed to the Reset terminal of F/F-4. The $\bar{Q}$ output from toggle flip-flop T-1 of channel (N-1) is fed to the second input of the Exclusive OR circuit No. 1. The second input of the Exclusive OR circuit No. 2 is obtained from the $\bar{Q}$ output of the toggle flip-flop circuit T-1 of channel (N+1).

The output one of the Count-to-two counter is connected to an input each of A-18, A-20 and A-21. The "two" output of the latter counter is connected to an input of A-19 whose output as well as that from A-18 is connected to the (−) input of the counter, as shown. An output of A-20 is connected through I-4 to one input of A-15 while an output of A-21 is connected through I-5 to one input of A-16.

The output of A-15 is connected to a memory cell readout and reset No. 1 as well as to an input of OR-6. An output of A-16 is connected both to an input to memory cell readout and reset No. 2 and to an input of OR-6. The output from A-15 is also fed over connection 48 to an input of each of the OR-6 circuits in all of the other channels. Likewise, the output of A-16 is fed over a connection 49 to another input of the OR-6 circuits in each of the other channels. An output from OR-6 is connected to one input each of A-17, A-18 and A-19. The output from Count-to-five circuit No. 1 is connected to a further input of A-15 while the output from Count-to-five circuit No. 2 is connected to a further input of A-16.

The $\bar{Q}$ output of F/F-1 is connected to a second input of A-20, while the $\bar{Q}$ output of F/F-2 is connected to a second input of A-21.

All of the components encircled by the phantom line 46 are part of the common system components bridging all 26 channels. Thus, scanner No. 1 has additional inputs connected to the respective outputs of the memory cells M-1-1 corresponding to each other channel, while the scanner No. 2 has additional inputs connected to the output of corresponding memory cells M-2-1 of the other channels. The circuits A-15 and A-16 have additional inputs connected, respectively, to the output of I-4 and I-5 of each other channel.

In addition, a system reset network is provided for applying reset signals to the reset terminal of each of the flip-flops and toggle flip-flops to place a high or logical 1 signal on the output corresponding to the respective reset terminal. That is, a reset applied to F/F-3 puts a logical 1 on the $\bar{Q}$ output while a reset signal applied to F/F-1 puts a logical 1 on the Q output. The convention being employed in the drawings is that the output on the same side of the rectangular symbol as the reset terminal is the one receiving the logical 1 condition. A reset signal is also applied to the Count-to-Two counter to set the same to its zero count position. This places a logical 1 at the zero output thereof.

Also in known manner all of the memory cells in the memory banks will be cleared and reset to their initial standby condition with logical 0 therein.

Operation of the scanners Nos. 1 and 2 is obtained by feeding signals thereto from a clock pulse source 47 at a constant rate. A periodic signal is obtained from scanner No. 1 over an output connection to the Reset input of the Count-to-five Circuit No. 1 and from scanner No. 2 to the Reset input of Count-to-Five circuit No. 2. The reset signal is developed once during each complete cycle of the respective scanner such that the Count-to-Five circuits are able to count the number of logical 1 signals found in the associated memory cell bank providing an output whenever five such signals are encountered. Since the output from the scanner is supplied through a falling edge detector circuit, the Count-to-Five circuit responds only to the signal obtained when the scanner moves from a memory cell of one channel which has been activated to a high logical 1 condition to an adjacent channel memory cell which remains unactivated or at a low condition. Thus, if two or more adjacent channels have been activated such that logical 1 signals are in their respective memory cells, the scanner in switching from channel to channel will provide a continuous high signal until an inactive memory cell is encountered. At such time the signal will fall and will produce an output through FED-2 or FED-3 into the associated Count-to-Five circuit to introduce an entry therein. Thus, the Count-to-Five circuit will count only the number of data marks or bits scanned by the scanning head regardless of how many adjacent sensor channels respond to the same mark.

Upon initial reset, T-1 will apply an enabling signal to A-3 and A-4 such that the first valid signal appearing at the input to amplifier 44 and 45 will be applied to the memory cells of the first bank. That is, signals will be applied to the aforesaid memory cells if such signals prevail for a sufficient length of time to overcome the delay afforded by D-2 and D-3. The delays of the latter, as well as that of D-6 and D-7, are signal dependent such that if the signal disappears before the conclusion of the delay no output will be furnished therefrom to the associated memory cell. All of the other delay circuits in the channel system are independent of signal duration providing a fixed and determinate delay for any input signal thereto.

Delay D-1 is required for establishing proper phasing. That is, the signal from FED-1 is applied through appropriate AND gates to act upon either F/F-3 or F/F-4. In addition, the FED-1 signal is fed through A-6 and OR-4 as well as OR-3 to switch T-1. It is required that the switching of T-1 be delayed until F/F-3 or F/F-4 can respond to the control signal. Such delay as effected by D-1 should be of relatively short duration.

The delays D-4 and D-5 are provided for a dual purpose. They are brief but must be sufficient to permit the signal from FED-1 which acts upon the respective flip-flops F/F-3 or F/F-4 to pass through A-6, OR-4 and act upon both the Count-to-Two counter and D-1 before A-6 is disabled. On the reverse operation the delay must be sufficient to preclude enabling A-6 before the signal from FED-1, which acts to reset F/F-3 or F/F-4, disappears.

Under certain circumstances, after a comparison of the routing status of toggle T-1 for the subject channel with the corresponding toggles T-1 of the (N−1) and (N+1) channels, it may be required that toggle T-1 be switched in state to shift the routing to the opposite memory bank before effecting an entry of the signals being sensed by the probe. To ensure such comparison and switching before entry of such signal, there is introduced the delays afforded by D-2, D-3, D-6 and D-7. Such delay must be sufficient to ensure that T-1 responds to any signal received through OR-5 prior to the signal applied to such delay passing therethrough and reaching the associated memory cell. More specifically, the delay should be somewhat greater than the electronic delay necessary for a signal to pass through A-14, OR-4, OR-3 into T-1 plus the time required for the latter to change its state. It will be understood, however, that such delay will be appreciably less than the shorter period of time anticipated for an index signal to be present by reason of the fastest movement of the probe ovr such signal encountered in the recording medium 19.

The operation of the circuit of FIG. 8 can now be considered. Assume that sensor pair 39M and 40M approach and pass over an index mark followed by a logical 0 data mark. At time ($t-2$) the data sensor 40M will apply a logical 1 signal to an input of A-2. However, in the absence of a signal from A-1 to the other input of A-2, a logical 0 will remain at the output of A-2. Thus, no signal will be applied to any of the memory cells.

Nothing further occurs until time ($t$) when a logical 1 appears at sensor 39M and a logical 0 appears at sensor 40M. So long as F/F-3 and F/F-4 are not in their Set condition, a high signal will appear at the output of A-13 enabling both A-1 and A-6. Thus, a logical 1 will appear at the output of A-1 while a logical 1 appears at the output of A-2. After the latter signal passes through I-1 it applies a logical 1 to A-5 enabling same to pass the signal obtained from the output of A-1. If T-1 is in its initial Reset condition, a logical 1 or high signal appears on A-3 and A-4. Therefore, A-4 is enabled and applies a logical 1 signal through OR-1 to D-2.

Assuming for the time being that T-1 of channels (N−1) and (N+1) are in the same state as T-1, neither of the Exclusive OR circuits No. 1 or No. 2 will apply a logical 1 to OR-5. Therefore, no supplemental switching or toggling signal will be fed to T-1. After an appropriate time interval determined by the delay provided by D-2 a logical 1 signal will be entered in memory cell M-1-1. However, since a logical 0 was applied to D-3, no signal will enter memory cell M-1-2.

Upon entry of a logical 1 in M-1-1, a signal appears at the output of RED-1 which shifts F/F-1 to its Set position applying a logical 1 from its Q̄ output to A-20. However, the one output of the Count-to-Two counter has a logical 0 output which is applied to A-20 such that a logical 0 output appears at the output of A-20. Hence, a logical 1 is provided by this channel for its input to A-15 at this time interval.

Scanner No. 1, activated by pulses from clock 47, is continually scanning the output of memory bank No. 1 containing memory cell M-1-1. Assuming that less than five data character bits have been entered in memory bank No. 1, no high signal will appear at the output of the Count-to-Five circuit No. 1. Therefore, there is still no Reset signal appearing at the output of A-15.

During the transition from time ($t$) to time ($t+1$) a drop in signal occurs at the output of amplifier 44, so as to cause a high or logical 1 signal to appear at the output of FED-1. It will be observed that only A-6 is enabled to pass this signal and passes it through OR-4 both to the (+) terminal of the Count-to-Two counter and to D-1. The input to the counter shifts its output from the zero to the one position, while the signal applied to D-1, after the requisite delay, is applied through OR-3 to shift toggle T-1 so as to disable A-3 and A-4 while enabling A-7 and A-8. Although the logical 1 appearing at the one terminal of the Count-to-Two counter applies an enabling signal to A-20, the logical 1 now appearing at the Q output of T-1 resets F/F-1 so as to remove the logical 1 from A-20. Hence, there is still no change in the condition of A-15.

In moving from time ($t+1$) to time ($t+3$), the index cell passes the data location. However, since a logical 0 has been entered in this particular data location it will not cause a stimulation of the index sensor 39M and no further action of the circuit will occur at this time.

Depending upon the skew of the reading head, the sensors of channel M may or may not encounter a subsequent data group before the memory bank No. 1 has been filled with the complete data character of five bits. If the occurrence of the full character in memory bank No. 1 is first, a logical 1 signal will be applied from the Count-to-Five circuit No. 1 to A-15. Assuming that all of the channels are providing a logical 1 output at their respective I-4 circuits, a high signal will appear at the output of A-15 which will accomplish several functions. It will initiate readout of the memory cells in memory bank No. 1 transferring the entries thereof to a central computer system, not shown. In addition, it will feed signals to all of the circuits OR-6 in the various channels to apply enabling signals to all of the gates A-17, A-18 and A-19. Remembering that as a result of the present operation a logical 1 appears at the one output of the Count-to-Two counter, a signal will appear at the output of A-18 which acts on the (−) input of the counter to decrease its count putting a logical 1 back on its zero output terminal. If the scanning of a second group data entries should occur prior to readout of the memory cell bank No. 1, it is possible for an entry to reach memory cell M-2-1. If time ($t+1$) has occurred with respect to that last mentioned entry, a signal will be applied through A-6 and OR-4 to the (+) input of the Count-to-Two counter advancing it to put a logical 1 on its two output. Assuming this to represent the maximum skew, a readout of memory bank No. 1 will have to occur before any further reading of a data group. This will cause in the manner previously described a signal to appear at the output of A-15 which will pass through OR-6 to enable A-19 applying a decreasing signal to the Count-to-Two counter returning its output to its one terminal.

Subsequent readout of memory cell readout and reset No. 2 by reason of a logical 1 appearing at the output of A-16 will in the manner recited above step the Count-to-Two counter back down to its "zero" condition. Alternatively, if an entry should be fed into the now empty memory bank No. 1, the Count-to-Two counter will be advanced back to the two position before being decreased back to the one position.

Now consider the operation when the same sensor pair described above encounters a logical 1 entry in the recording medium 19. From time ($t-3$) until ($t$), the operation will be the same as that described for encounter with a logical 0. However, at time ($t$), both sensor 39M and sensor 40M will be activated by logical 1 signals. Assuming initial reset condition, it will be apparent that a logical 1 signal will appear at the output of A-2. Assuming A-3 and A-4 to be enabled, A-3 will pass the logical 1 directly to D-3 and through OR-1 to D-2. Assuming, further, that no adjacent channel correction is required, the logical 1 signals will pass through D-2 and D-3 into respective memory cells M-1-1 and M-1-2. As before, F/F-1 will be set by the signal through RED-1. In addition, memory cell M-1-2 will apply a logical 1 to one input of A-9. A second input of A-9 is fed with a logical 1 from the Q output of T-1.

Now, the transition from time ($t$) to time ($t+1$) causes a logical 1 to appear at the output of FED-1 which is supplied to the third input of A-9 causing a Set signal to be applied to F/F-3. This applies a logical 1 from the Q output thereof to one input of A-10 and to the input of I-2. The output from the latter is now at a logical 0 which causes, after the delay of D-4, A-13 to apply a logical 0 signal to A-1 and A-6 disabling both of the latter gates. However, before such disabling action takes place the signal at the output of FED-1 passes through A-6 and OR-4 to act upon both D-1 and the (+) input of the Count-to-Two counter. Therefore, the latter is stepped to its one count while a signal is applied through OR-3 to shift the condition of T-1. As previously described, the last mentioned action resets F/F-1 and changes the signal routing to the second memory bank.

At time ($t+2$) index sensor 39M will encounter the logical 1 entry in the data location. However, since A-1 is presently disabled by virtue of the setting of F/F-3 the signal received from sensor 39M is inhibited from passing therethrough. Therefore, nothing occurs at this time interval and the index sensor is prevented from causing a false reading due to its encountering a data rather than an index mark.

At the transition to time ($t+3$), the disappearance of the logical 1 at sensor 39M applies a logical 1 at the output of FED-1. Since A-6 is still disabled, the output from FED-1 can only act upon A-10 which has been enabled by the setting of F/F-3. Hence, a signal is applied by A-10 to reset F/F-3. This restores enabling signals to A-1 and A-6, but at a time after the disappearance of the signals from sensor 39M and from FED-1.

It should be understood that the foregoing operation described in connection with memory cell M-1-2 and flip-flop F/F-3 for inhibiting A-1 and A-6, is equally descriptive of the operation of memory cell M-2-2 and flip-flop F/F-4 when toggle T-1 is in position to enable A-7, A-8 and A-11. That is, elements A-11, A-12 and F/F-4 provide the same corrective function for the second memory bank as the corresponding elements A-9, A-10 and F/F-3 provide for the first memory bank.

It will also be apparent that scanner No. 2, FED-3, Count-to-Five circuit No. 2 and A-16 perform an identical function for the second memory bank as the corresponding elements peviously described with reference to scanner No. 1 perform for the first memory bank.

Because of a possible shift in registration similar to that illustrated between FIGS. 4 and 5, a given sensor pair may skip a data group and, therefore, its toggle T-1 will be set in the incorrect routing position. It is assumed that this can occur only when the corresponding Count-to-Two counter is in the zero condition. Thus, whenever a valid signal is sensed by the index sensor, for example, 39M, a signal will be applied to enable A-14 to provide a logical 1 at its output if it is receiving a logical 1 from OR-5. The latter provides a logical 1 whenever T-1 is in a different condition than either or both T-1 (N−1) and T-1 (N+1).

It should be apparent to those skilled in the art from a consideration of the foregoing discussion that the invention is subject to various modifications and implementation. For example, if additional skew is to be encountered such that the probe might simultaneously read more than two data groups, the logic circuitry can be provided with additional memory banks and associated control circuitry duplicating the circuitry provided for memory bank 1 or 2.

The electronic logic system can be used with other than hand held reading probes where lack of registration is anticipated between probe and recorded medium or substantial skew or both. The manner of recording may be altered. For example, optical recording may be employed with an optical reading head rather than a magnetic reading head.

Variations in the magnetic recording will also occur to those skilled in the art. For example, the signal bits may consist of magnetic ink markings on a non-magnetic substrate. Another method would be to use magnetic signal recording in a magnetic medium such as tape or ink or the like. That is, it should be apparent that the electronic control system described in the present application can be used with any method of signal pick-up wherein a registration and skew problem is to be encountered. The only restraint is the geometry of the encoding so that it is properly related to the reading head and to the electronic logic.

One limitation on the maximum tolerable skew which can be handled by the system is a function of the geometry of the encoding on the stripe 19 and its relationship to the geometry of the reading head 21. The relative geometry must be such that for any given entry the second index sensor to read the identical entry must encounter the index mark of such entry before the prior sensor reading the same entry departs from said index mark. For example, assume the situation shown in FIG. 5 with respect to channels M and N. Assume also that the skew is such that 39M encounters mark 41 before 39N. Therefore, 39N must arrive at time (t) before 39M reaches time (t+1). This relationship is necessary for flip-flops F/F-1 and F/F-2 to perform their described function of briefly preventing readout of the memory bank in spite of a signal from the corresponding Count-to-Five circuit until the last of the pairs of sensors responding to a single data mark have completed their reading. Thus, it is ensured that complete entry of the 5 bits of a data character is effected in the memory section before readout is commenced.

From the foregoing it will be appreciated that the electronic logic requires at least one effectively inactive channel between each effectively active channel. The specific embodiment which has been illustrated and described ensures said relationship by providing for at least two sensor cells or channels to respond to each mark with at least one unactivated sensor or channel inbetween. However, it is possible to implement substantially the same operation with fewer than $(3x-1)$ sensors and channels if threshold response and control is relied upon to ensure that all marks will be detected and that for each at least one channel will sense the mark with at least one inbetween channel being considered as unaffected. In this latter case the requirement is reduced to as few as $2x$ channels.

One way to implement the latter is to arrange for partial coverage of a sensor by a mark to be determined as a logical 1 or zero as a function of the percent of cell coverage by the mark. For example, this can be instrumented with a preset signal amplitude threshold determining a "mark" or "no mark" condition, corresponding to greater than a first predetermined coverage percent or less than a second predetermined coverage percent, respectively.

Having described a presently preferred embodiment of the subject invention, it will occur to those skilled in the art that various changes may be made therein without departing from the true spirit of the invention as defined in the appended claims.

What is claimed is:

1. A data processing system for recording data in machine readable form in a recording medium in multiple parallel spaced apart channels and reading said data from said medium with a scanning sensor, characterized by a sensor for scanning simultaneously said parallel channels in said recorded medium at least in the general direction of said parallel channels but with less than perfect spatial restraint, means coupled to said sensor responsive to signals detected thereby in said parallel channels for determining when signals have been detected in all of said channels, and means activated by said last mentioned means for reading the data from all of said channels in spite of any shifting relative registration and skew between said sensor and said recorded medium.

2. A data processing system according to claim 1, wherein said sensor comprises a hand holdable probe.

3. A data processing system in which data is recorded along a path in a recording medium in parallel equidistantly spaced apart channels, comprising a reading head for traversing said path to scan said data, said head having a linearly disposed array of pairs of sensors, with the sensors of each pair being effectively spaced apart to form two spaced apart parallel arrays of sensors, each pair of sensors being effectively spaced from the adjacent pair, the spacing between and the size of the field covered by each sensor being related to said equidistantly spaced channels and to said recorded data such that upon causing said head to traverse said path, at least two adjacent pairs of said sensors will respond to the recorded data in each of said channels and at least one pair of nonresponsive sensors will be disposed between pairs of sensors responding to adjacent channels.

4. The method of recording data in a recording medium along a path scannable by a reading head which comprises recording a linearly disposed array of index bits transverse to said path at spaced intervals along said path, said index bits in an array being substantially equally spaced from each other and aligned with the bits in adjacent arrays to define along said path a plurality of substantially parallel channels, the number of said bits in each of said arrays being equal to the number of bits in a data character, and recording said data in data characters with each character adjacent and substantially parallel to a different one of said arrays of index bits, said character being composed of data bits each substantially coinciding with a different one of said channels.

5. The method according to claim 4, wherein said recording medium comprises a stripe of magnetic recording material, and said recording is accomplished by punching holes through said material at the corresponding bit location to record where required a logical 1, with the absence of a hole at a bit location serving to record a logical 0 and recording all of said index bits as a logical 1.

6. A data processing system in which data is recorded in machine readable form in a recording medium in $x$ parallel spaced apart channels at spaced locations along said channels following a given path, comprising a reading head for traversing said path with less than perfect spatial restraint, said head having an array of at least $2x$ sensing means such that in psite of skew each of said channels will be read by at least one of said sensing means, and at least one unused sensing means at any instant in the traverse of said head will be present between sensing means responding to adjacent channels, a plurality of memory banks, each bank having individual memory means corresponding to each of said sensing means, control means coupled to each of said sensing means and to said memory means for routing signals detected by said sensing means to a selected memory bank for entry in a corresponding memory means, said control means including means for routing signals read at a common location to the same memory bank with signals read at successive locations being routed to a different one of said memory banks.

7. A data processing system according to claim 6, wherein scanning means are coupled, respectively, to each of said memory banks for continually scanning the contents thereof and responsive to the difference in state between entered and unentered memory means of a given bank for providing an output signal whenever signals from $x$ channels are entered in said given bank.

8. A data processing system comprising a reading head having an array of sensors grouped in pairs with each pair corresponding to a separate channel and consisting respectively of an index and a data sensing sensor, a first bank of memory cells including a first and a second memory cell for each of said channels, a second bank of memory cells including a third and a fourth memory cell for each of said channels, switching means interconnecting said index and data sensing sensors of a given channel selectively with either said first and second or said third and fourth memory cells of said given channel, means coupled to said index sensing sensor and to said corresponding switching means for altering the switching mode of the latter each time said index sensing sensor completes a reading of a recorded mark, means included in each of said channels for inhibiting said last mentioned switching action for one mark encounter by the corresponding index sensing sensor whenever a signal has been entered into either said second or fourth memory cell, and means for entering a signal into said second or fourth memory cell only in response to both said index and data sensing sensors simultaneously reading a recorded mark, said pairs of sensors being disposed in tandem such that both sensors of a pair read successively both recorded index and data marks.

9. A data processing system comprising a bank of memory cells, means for scanning a recording medium containing characters of $x$ bits recorded in machine readable form where $x$ is less than the number of cells in said memory bank, means interconnecting said scanning means with said memory bank of memory cells for effecting an entry in at least one cell for each of said bits detected by said scanning means and having at least one unentered cell between entered cells which correspond to different bits, and further scanning means coupled to said bank of memory cells for continually scanning the contents thereof and responsive to the difference in state between entered and unentered cells for providing an output signal whenever $x$ bits are entered in said bank of memory cells.

10. A data processing system according to claim 9, wherein said entered and unentered states of a memory cell are represented by a high and low signal condition, respectively, and said further scanning means comprises a falling edge detector, a sequenching switch interconnecting said bank of memory cells with said falling edge detector for sequentially connecting each of said memory cells of said bank to said falling edge detector whereby the latter provides an output whenever said switch advances from a memory cell with a high signal condition to an adjacent memory cell with a low signal condition, and a counter coupled to said falling edge detector for counting the outputs therefrom and providing said output signal whenever $x$ outputs from said falling edge detector are counted.

11. A data processing system comprising a bank of memory cells each having an inactive and an active state, means coupled to said bank for resetting all of said cells to said inactive state, means coupled to said bank for changing the state of selected ones of said cells to the active state, scanning means coupled to said bank for sequentially scanning in a given direction all of said cells and providing an output signal each time an inactive cell is encountered following an active cell, means coupled to said scanning means for counting the output signals therefrom and for providing a control signal for actuating said resetting means when a predetermined count is reached, means coupled to both said bank of memory cells and said means for changing the state of said cells for inhibiting said control signal from said counting means while a state changing signal is being supplied to any cell of said bank.

12. A data processing system comprising a plurality of channels, each channel comprising a signal sensor, a first memory section, a second memory section, and control means for routing a signal from said sensor to one or the other of said memory sections; said control means including means responsive to the acquisition by said sensor of a signal for initially routing said signal to said first memory section but shifting said routing to said second memory section if an adjacent channel is conditioned to route a signal to its corresponding second memory section.

13. A data processing system according to claim 12, wherein said control means further includes means responsive to said sensor detecting the termination of a signal for shifting said routing from the just entered memory section to the other memory section.

14. A data processing system for recording data in machine readable form in a recording medium along a path and reading said data from said medium with a scanning sensor, characterized by said data being composed of character bits recorded along said path with the characters of equal length and the bits of each character located in a different straight line array normal to the longitudinal axis of said path, each bit lying in a corresponding value significant channel extending parallel to said axis, and each character being accompanied by a parallel array of recorded index bits, one index bit for each value significant channel; a sensor for scanning said recording medium at least in the general direction of said path but with less than perfect spatial restraint, and means coupled to said sensor responsive to signals detected thereby for identifying said data and determining the respective value significant channels thereof in spite of any shifting relative registration and skew.

15. A data processing system according to claim 14, wherein said sensor comprises a hand holdable probe having two parallel linearly disposed arrays of sensing cells with each of said last mentioned arrays including at least $2x$ cells where $x$ equals the number of bits in a single character.

\* \* \* \* \*

UNITED STATES PATENT OFFICE
CERTIFICATE OF CORRECTION

PATENT NO. : 3,963,901
DATED : June 15, 1976
INVENTOR(S) : James Constantine Gevas It is certified that error appears in the above-identified patent and that said Letters Patent are hereby corrected as shown below:

Column 1, line 13, "represent" should read --represents--. Column 2, line 48, "recoding" should read --recording--; lines 61 and 62, "Warehouse Record" should read --"Warehouse Record"--. Column 3, lines 57 and 62, "405" should read --"405"--. Column 4, line 20, "4" should read --"4"--; line 21, "significance" should read --significant location--. Column 6, line 24, "locking" should read --looking--; line 42, "OR-" should read --"OR-"--; line 43, after "gate" should be inserted --as--; line 48, "RED" should read --"RED"--; line 50, "D-" should read --"D-"--. Column 7, line 62, after "each" should be inserted --of--. Column 8, line 20, "one" should read --"one"--; lines 38 and 40, and Column 9, line 8, "Count-to-five" should read --Count-to-Five--. Column 10, line 11, after "OR-4," should be inserted --D-1,--; line 14, "shorter" should read --shortest--; line 32, "logical 1" should read --logical 0--. Column 10, line 51, Column 11, lines 6, 33, 50 and 58, Column 12, line 21, "one" should read --"one"--. Column 11, line 8, "Q" should read --$\overline{Q}$--; lines 43 and 57, "two" should read --"two"--. Column 11, line 65, "1signals" should read --1 signals--. Column 13, line 33, after "given" should be inserted --data--; line 48, "5" should read --five--. Column 15, line 7, "psite" should read --spite--; line 57, "memory" (first instance) should be deleted; line 59, "having" should read --leaving--. Column 16, line 2, "sequenching" should read --sequencing--.

Signed and Sealed this

Twenty-first Day of December 1976

[SEAL]

Attest:

RUTH C. MASON
*Attesting Officer*

C. MARSHALL DANN
*Commissioner of Patents and Trademarks*